Sept. 4, 1951  W. G. COLLINS  2,566,718
DOLLY AND LIKE TRANSPORTING DEVICE
Filed Feb. 26, 1947  4 Sheets-Sheet 1
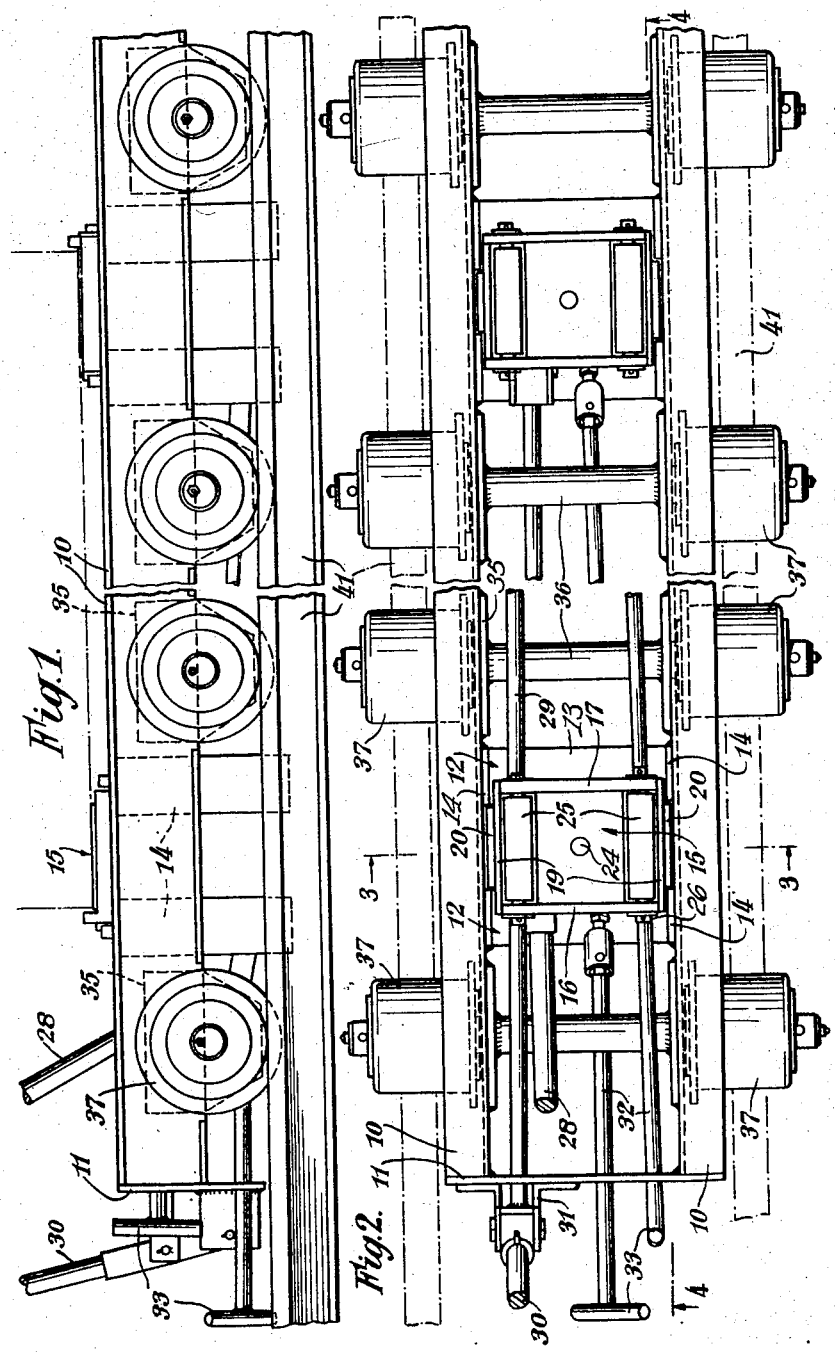
INVENTOR
BY WILFRED G. COLLINS
ATTORNEY

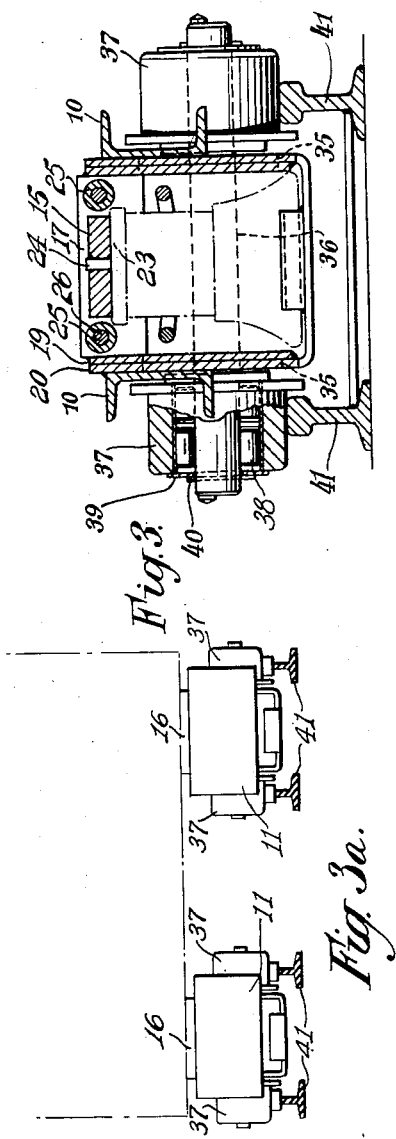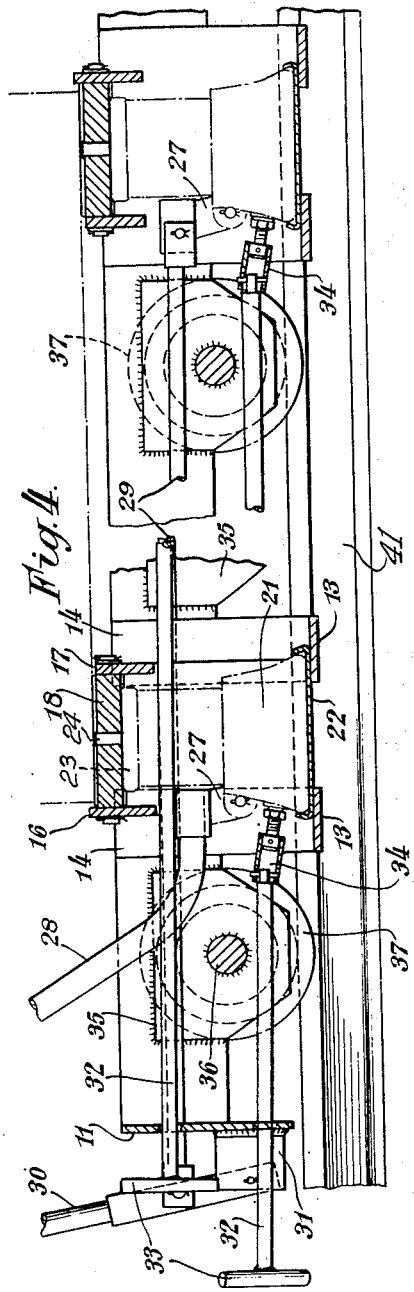

Sept. 4, 1951  W. G. COLLINS  2,566,718
DOLLY AND LIKE TRANSPORTING DEVICE
Filed Feb. 26, 1947  4 Sheets-Sheet 3

INVENTOR
BY WILFRED G. COLLINS
ATTORNEY

Sept. 4, 1951            W. G. COLLINS            2,566,718
DOLLY AND LIKE TRANSPORTING DEVICE
Filed Feb. 26, 1947            4 Sheets-Sheet 4
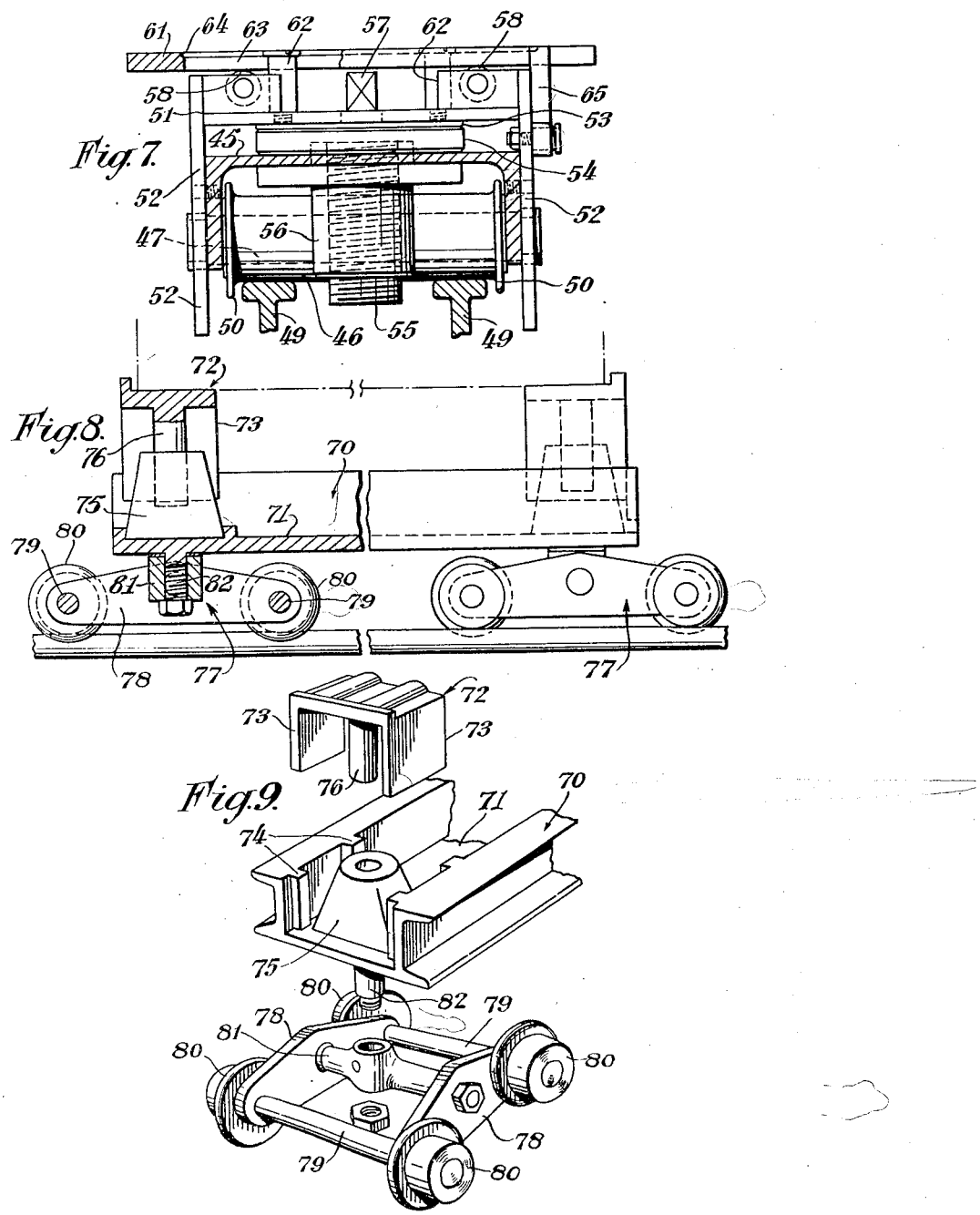
INVENTOR
BY WILFRED G. COLLINS
ATTORNEY Patented Sept. 4, 1951

2,566,718

UNITED STATES PATENT OFFICE 2,566,718

DOLLY AND LIKE TRANSPORTING DEVICE

Wilfrid Greville Collins, London, England

Application February 26, 1947, Serial No. 731,080
In Great Britain February 21, 1946

Section 1, Public Law 690, August 8, 1946
Patent expires February 21, 1966

4 Claims. (Cl. 105—367)

This invention relates to dollies and like transporting devices, and has for its object to provide an improved dolly or the like having means for adjusting the position of the load thereon relative to the base of the said dolly or the like.

According to the invention, a dolly or like transporting device comprises a base provided with wheels or rollers for guiding and supporting the dolly or the like on a rail or rails, a load-carrying member mounted on said base, and means for adjusting the position of said load-carrying member relative to said base in a vertical direction.

The load carrying member may be provided with horizontal rollers to support the load, the axes of the said rollers being parallel to the rail or rails on which the dolly is supported so that the load is readily movable in a direction laterally of said rails.

A platform may be mounted on the horizontal rollers to receive the load, and a screw jack or a hydraulic jack may be provided between the base and the load-carrying member.

The dolly or like transporting device may comprise an elongated base having two load carrying members, one adjacent each of its ends.

The invention is hereinafter described with reference to the accompanying drawings, in which:

Figure 1 is a side elevation of one form of dolly according to the invention, primarily adapted for transporting prefabricated sections of buildings;

Figure 2 is a plan view of the dolly shown in Figure 1;

Figures 3 and 4 are sectional elevations taken respectively on the lines 3—3 and 4—4 of Figure 2;

Figure 3a is a fragmentary sectional view showing an arrangement of dollies wherein the load extends laterally of the rails for the dollies and resting on the dollies.

Figure 5:
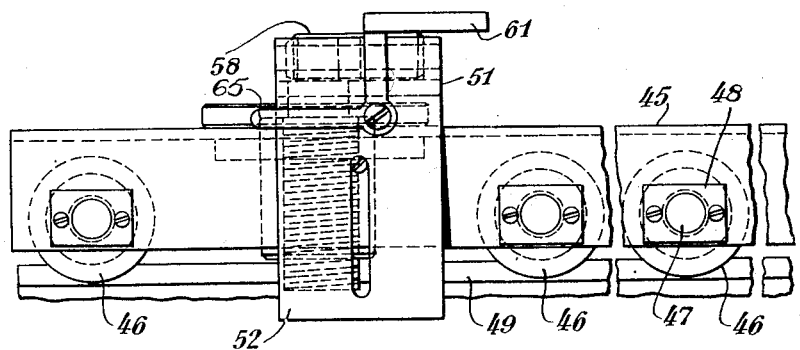
Figure 6:
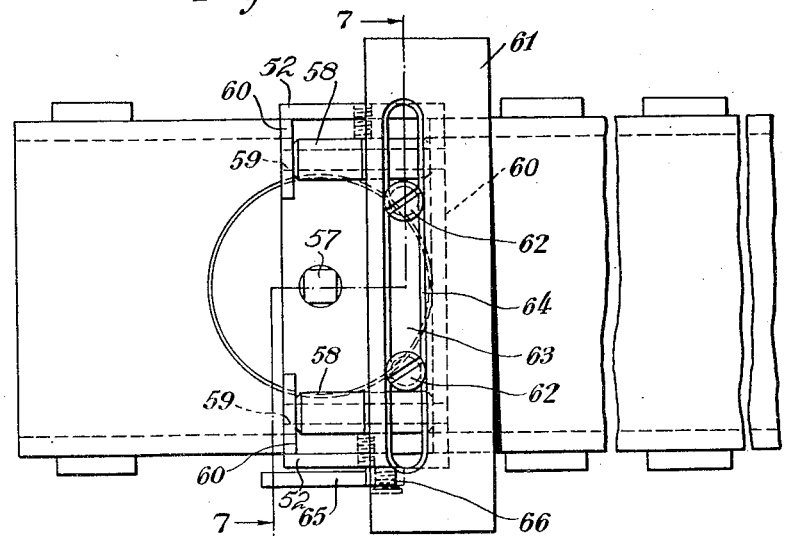

Figures 5 and 6 are respectively a partial side elevation and a partial plan of another form of dolly according to the invention;

Figure 7 is a section on the line 7—7 of Figure 6;

Figure 8 is a diagrammatic side view of a further form of dolly; and

Figure 9 is an exploded view of one end of the dolly shown in Figure 8.

Referring to Figures 1 to 4, the base of the dolly comprises a pair of channel section members 10—10 arranged back-to-back, and connected by end plates 11, and by intermediate cross members (not shown). Near each end of the base, the space between the side members 10 is bridged by a pair of spaced metal strips 12, each strip being bent to form a flat base part 13 between two upwardly projecting arms 14, and the arms being welded to the side members. The base parts 13 of the strips are below the side members. Each pair of strips 12 supports a load-carrying member 15 comprising end plates 16, 17 connected by a bridge piece 18 and by side plates 19, the latter having welded to them by vertical strips 20 adapted to fit between the vertical arms 14 of the strips 12, so that the members 15 are guided for vertical movement in the base. The body 21 of a hydraulic jack is supported on the bases 13 of each pair of strips 12, being located thereon by the up-turned ends of a tray 22 welded to the said strips, the ram 23 of the jack having an upwardly projecting lug 24 welded into a hole in the bridge piece 18 of the load carrying member. Rollers 25 mounted on pins 26 extending between the end plates 16 and 17 of each load carrying member project above the side plates 19 and end plate 17, the end plate 16, which is nearer to the end of the dolly having its upper edge above the tops of the rollers.

The body of each jack has built into it a pump for placing liquid under pressure to raise the ram, and a relief valve for releasing liquid to permit the ram to descend. The pumps (not shown) are actuated by bellcrank levers 27 pivotally mounted on the jack bodies 21, but, in order that both jacks may be operated from one end of the dolly, the jack nearer to that end has a handle 28 directly attached to the lever 27, whilst the lever 27 of the other jack is connected by a rod 29 to a handle 30 pivotally mounted in a bracket 31 welded to the end plate 11 of the base nearer to the first jack. The relief valve of each jack is of the screw-down type, and is operated by a rod 32 extending through the endplate 11 of the base on which the bracket 31 is mounted, each rod 32 having a cross-member 33 forming a handle. Universal joints 34 are provided between the rods 32 and the valves.

Flat brackets 35 welded to the side members 10 of the base support axles 36, the axles being welded to the brackets. Flanged wheels 37 are mounted on roller bearings 38 on the axles and are retained thereon by washers 39 and split-pins 40. The lower flanges of the side members 10 are cut away to clear the wheels. There are two pairs of wheels adjacent each end of the dolly, the load-supporting member at each end being arranged mid-way between the two pairs of wheels at that end.

The dolly is adapted to run on a pair of rails 41—41, and two dollies running on spaced pairs of rails may conveniently be employed for transporting a large load such as a prefabricated section of a building. The following description indicates the manner of using the dolly for this purpose.

The buildings are brought to the site in sections arranged for erection in end-to-end relationship. Dwarf walls or footings are erected on which the sections are to rest, and two spaced pairs of rails are laid from the unloading point for the sections to the erection site, the rails running at right angles to the planes of meeting of the sections of the building, and extending between the dwarf walls. A dolly according to the invention is supported on each pair of rails. A section of the building is transferred to the two dollies at the unloading point, the section resting on the rollers 25 of the four load-carrying members of the two dollies, and the dollies are then moved along the rails until the section is over the dwarf walls, in the position it is to occupy. Lateral adjustment of the position of the section may be effected by moving the building section relative to the bases of the dollies, on the rollers 25 of the said load carrying members, and the section is then lowered on to the dwarf walls by means of the jacks. The lateral adjustment is particularly useful when a second or subsequent section is being positioned and secured to a section already in place, since very fine adjustment of the position of the second section can be achieved to ensure proper register of the attachment means on the sections.

After a section of building has been lowered on to the dwarf walls, the load-carrying members are further lowered by means of the jacks, and the dollies withdrawn.

The dolly shown in Figures 5 to 7 has a base 45 consisting of a single inverted channel-section member between the sides of which are mounted six transverse rollers 46, spaced along the length of the base, each roller 46 being freely rotatable on a spindle 47 passing through the sides of the channel and located against endwise movement by plates 48 bolted to the outer sides of the base 45, and receiving, in holes of appropriate size, the reduced ends of the spindles 47. The rollers 46 are flanged at their ends, and are adapted to rest on a pair of spaced rails, 49, with their flanges 50 engaging the outer sides of the rails.

A load carrying member comprising a saddle 51 of inverted U-shaped is mounted towards each end of the base, the sides 52 of the said saddle extending downwardly and engaging with the sides of the base to restrain the saddle against angular movement in a horizontal plane. To the underside of the top of the saddle is secured a thrust washer 53 on which bears the enlarged head 54 of a jack screw 55 which co-operates with a nut 56 carried by the base, a squared upward projection 57 of the jack screw passing through the thrust washer and the top of the saddle to receive a key, preferably of the ratchet type, for operating the jack.

A pair of rollers 58, with their axes horizontal and parallel to the lengths of the base are mounted to rotate on pins 59 extending between upstanding ears 60 on the top of the saddle, and a flat platform 61 rests on the rollers 58, being retained in position thereon by a pair of bolts 62 passing through a slot 63 in the platform and engaging screw threaded holes in the saddle. The axis of the slot 63 is perpendicular to the axes of the rollers 58, so that the platform is free to move in a direction at right angles to the length of the base. The bolts 62 have flat heads, and the slot 63 is enlarged towards the upper surface of the platform, as at 64 to provide a shoulder on which the said heads engage, the heads being of such a thickness that they do not project above the plane of the top of the platform. A latch 65 pivotally mounted on one side of the saddle 51 co-operates with one or more notches 66 in the platform 61 to prevent movement of the latter.

The dolly shown in Figures 5 to 7 is adapted for use in the same way as that shown in Figures 1 to 4. With this arrangement, however, the load does not rest directly on the rollers of the load-carrying members, but is supported by the platforms 61, which themselves rest on the rollers.

In order that the dolly may be capable of negotiating curves in its supporting rails, it may be mounted on bogies capable of pivoting about vertical axes relative to the base of the dolly, the said axes being substantially in line with the centres of the load carrying members, in order that the loaded dolly may remain stable when negotiating a curve, in spite of its narrow track. Figures 8 and 9 of the drawings show a dolly mounted on bogies. The base 70 of the dolly comprises channel-section side members connected by a web 71, the load carrying members 72 having downwardly extending side plates 73 guided between ribs 74 on the side members of the base, and being raised by hydraulic jacks having bodies 75 and rams 76. Each dolly is supported on two four-wheel bogies 77, each bogie comprising a pair of side plates 78 carrying the axles 79 on which the wheels 80 are mounted, the side plates 78 being mounted for rocking movement on a cross-member 81 itself mounted on a vertical pivot pin 82 projecting downwardly from the base 70 of the dolly. As shown, the pivot pin 82 is co-axial with the jack ram 76, which is centrally disposed with respect to the load-carrying member 72. The ability of the bogie side-members to rock on the cross-member 81 enables the load on the dolly to be shared equally between the wheels if the rails are laid on uneven ground so that their inclination in a longitudinal direction changes from point to point.

Whilst its use has been described in connection with prefabricated buildings, the dolly according to the invention may evidently be used for other purposes, such as for moving heavy machinery.

What I claim is:

1. Means for transporting and accurately locating a heavy and bulky load comprising a pair of elongated dollies each mounted for movement on one of two sets of parallel rails, a pair of spaced load-carrying members mounted on each dolly, idle horizontal rollers journalled in fixed position on and projecting above each each of the load-carrying members mounted with their axes parallel to the rails for independently or jointly supporting a load, and means for adjusting the vertical position of each of said load-carrying members with respect to the dolly on which it is mounted, whereby the load supported on each or the pair of load-carrying members can be transported in the direction of the length of the rails and its position adjusted on the rollers for location purposes by lateral shifting movement on the rollers, or vertical movement with the load-carrying members.

2. A dolly or like transporting device comprising an elongated base, two bogies provided with wheels, central horizontal pivotal mountings for said bogies on said base whereby the bogies are adapted to tilt in a fore and aft direction relative to the base, two load-carrying members mounted on said base one adjacent each end of said base, a vertical pivotal mounting on said base for said bogies and said vertical mounting being respectively substantially in alignment with the centres of the load-carrying members, means for adjusting the position of each of said load-carrying members in a vertical direction relative to the base, and horizontal rollers mounted on each of said load-carrying members to support the load, the axes of the said rollers being parallel to the rail track, so that the load is readily movable in two directions perpendicular to the direction of its movement along the rail track and in a vertical direction relative to the base.

3. A dolly or like transporting device comprising an elongated base, two bogies provided with wheels, central horizontal pivotal mountings for said bogies on said base whereby the bogies are adapted to tilt in a fore and aft direction relative to the base, two load-carrying members mounted on said base one adjacent each end of said base, a vertical pivotal mounting on said base for said bogies and said vertical mounting being respectively substantially in alignment with the centres of the load-carrying members, and means for adjusting the position of each of said load-carrying members in a vertical direction relative to the base.

4. A dolly or like transporting device comprising an elongated base, wheels for guiding and supporting the device on a rail track, two load-carrying members disposed one adjacent each end of the base, a lifting jack between the base and each load-carrying member for adjusting the said load-carrying member in a vertical direction relative to the base, operating means for the two lifting jacks, control means for said jack operating means located at one end of said device so that both jacks are controlled from the same end, and idle horizontal rollers mounted on each of said load-carrying members to support the load, the axes of the said rollers being parallel to the rail track, so that the load is readily movable in directions perpendicular to the direction of its movement along the rail track and to a vertical direction relative to the base.

WILFRID GREVILLE COLLINS.

REFERENCES CITED

The following references are of record in the file of this patent:

UNITED STATES PATENTS

| Number | Name | Date |
|---|---|---|
| 1,342,761 | Richardson | June 8, 1920 |
| 1,573,918 | Dewhirst | Feb. 23, 1926 |
| 2,327,446 | Ortgies | Aug. 24, 1943 |

FOREIGN PATENTS

| Number | Country | Date |
|---|---|---|
| 627,241 | Germany | Mar. 11, 1936 |